United States Patent

Cline

[15] 3,647,495

[45] Mar. 7, 1972

[54] TITANIUM DIOXIDE PIGMENT HAVING IMPROVED DISPERSIBILITY IN COATING COMPOSITIONS

[72] Inventor: Charles W. Cline, Somerville, N.J.

[73] Assignee: N L Industries, Inc., New York, N.Y.

[22] Filed: Jan. 29, 1970

[21] Appl. No.: 6,949

[52] U.S. Cl. ..................................106/300, 106/308 Q
[51] Int. Cl. ..................................................C09c 1/36
[58] Field of Search ..................................106/300, 308 Q

[56] References Cited

UNITED STATES PATENTS

| | | | |
|---|---|---|---|
| 3,076,719 | 2/1963 | Whately et al. | 106/308 Q |
| 3,531,310 | 9/1970 | Goodspeed et al. | 106/300 |

*Primary Examiner*—James E. Poer
*Attorney*—Charles F. Kaegebehn, Robert L. Lehman, Harold L. Gammons and Robert L. Holiday

[57] ABSTRACT

A highly dispersible titanium dioxide pigment which may or may not be coated with a hydrous oxide such as alumina, titania or silica and mixtures thereof contains a coating of from 0.35 to 1.50 percent 2,2,4-trimethyl-1,3-pentanediol on pigment weight basis.

6 Claims, No Drawings

TITANIUM DIOXIDE PIGMENT HAVING IMPROVED DISPERSIBILITY IN COATING COMPOSITIONS

BACKGROUND OF THE INVENTION

Titanium dioxide pigment is produced commercially by either of two well-known processes, namely, the so-called sulfate process or the chloride process. In practicing the sulfate process a titanium dioxide hydrate is precipitated from a titanium-sulfate solution and subsequently calcined at elevated temperatures to develop discrete $TiO_2$ particles having a particle size within a predetermined range effecting both optimum optical and physical properties in surface coating compositions containing the same. It is well known in the art however that a $TiO_2$ hydrate in addition to comprising many individual $TiO_2$ particles also includes clusters of individual $TiO_2$ particles commonly referred to as aggregates; and that these aggregates increase in size and become sintered during calcination, as a consequence of which the calcined $TiO_2$ includes many large hard aggregates.

It is necessary therefore to grind or mill calciner discharge to break up or reduce the size of the aggregates and while the wet and dry milling techniques in current use are highly effective the milled pigment inevitably contains some aggregates which when introduced into a surface coating composition, i.e., an alkyd or acrylic paint system, tend to form agglomerates. Although the latter may be relatively soft and weakly bonded nevertheless, despite the expenditure of considerable energy in the preparation of pigmented surface coating compositions, many agglomerates remain intact. Consequently, pigment wetting and dispersion which shall for simplicity be termed dispersion or dispersibility, is less than ideal for producing surface coating compositions having optimum optical and physical properties.

The art is replete with various techniques for improving pigment dispersion including treatment of the $TiO_2$ pigment prior or subsequent to final milling with various organic agents, such as for example neopentyl glycol or polyethylene glycol-ethylene oxide polymer having a molecular weight of about 200 and while these organics have effected marked improvement in dispersion over untreated pigments, even better dispersion ratings are necessary to satisfy the increasing demands for more easily dispersible $TiO_2$ pigment and more homogeneous coating compositions.

SUMMARY OF THE INVENTION

The present invention relates to $TiO_2$ pigment combining superior wettability and dispersibility in surface coating compositions with excellent optical properties and is prepared by coating a $TiO_2$ pigment, which may contain one or a combination of hydrous oxides selected from the group consisting of alumina, silica and titania, with from 0.35 to 1.5 percent 2,2,4-trimethyl-1,3-pentanediol on a pigment weight basis.

It has been found that a titanium dioxide pigment surface treated with the particular diol of this invention is not only easily dispersed in alkyd and acrylic surface coating compositions but that during formulation the pigment agglomerates are broken up into discrete particles with less expenditure of energy. Moreover the diol treatment has no deleterious effect on other properties of the pigment such as for example, color, tinting strength, oil absorption, and the like.

DESCRIPTION OF PREFERRED EMBODIMENT

The titanium dioxide pigment used in the present invention may be either a sulfate-base pigment or a chloride-base pigment; and may be either in the anatase or rutile form. Moreover the pigment may be coated or uncoated prior to treatment. It is preferred however that the pigment be coated with one or more of these agents for improving the color and chalk resistance of the finished pigment, such agents including hydrous oxides of aluminum, silicon, titanium, zirconium and mixtures thereof, which coatings may or may not be calcined, the preferred quantities of such coatings being in the range from 0.1 to 10 percent and especially from 0.5 to 5.0 percent by weight of $TiO_2$.

The diol used to treat the pigment in the instant invention is a white crystalline material. It possesses a fairly low melting point, is insoluble in water but is readily soluble in acetone or butyl cellosolve. The pentane diol has two methyl groups in the second position and one methyl group in the fourth position with an hydroxyl group in both the first and third position. The formula may be written as follows:

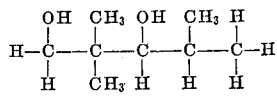

The treated pigment of this invention is prepared by a process which in general comprises applying a surface coating of a small amount of the diol to the pigment particles. The diol may be applied to the titanium dioxide pigment in various ways. The diol for example may be dissolved in a suitable solvent, as for example acetone or a water and acetone mixture, to form a solution which may be sprayed onto the pigment as it is fed into the micronizer or upon leaving the drier or the organic agent may be added to the pigment as a dry powder.

It is also within the preview of the invention to treat a chloride base $TiO_2$ pigment with the diol and in this instance the diol solution may be conveniently introduced as a fine spray or aerosol into the $TiO_2$ burdened reaction gas stream, after the latter has been cooled to a suitable temperature, to coat the individual $TiO_2$ particles.

The amount of diol retained on the titanium dioxide for enhancing its wettability and dispersibility in surface coating compositions is surprisingly small. Amounts as small as 0.35 percent to no more than 1.50 percent on a pigment weight basis have been found highly effective. Amounts above 1.50 percent appear to have no additional beneficial effect and hence 1.50 percent is regarded as the practical upper limit. The amount of diol present on the pigment is determined by analyzing the percentages of carbon contained on the pigment after milling.

Since the carbon comprises one half the molecular weight of the diol, the carbon measured on the diol treated pigment constitutes about one-half of the amount of diol retained thereon.

The amount of diol used in the treatment of the pigment is of course greater than that retained on the pigment and depends to some extent on the treatment technique used. In general it has been found that when the diol is added as a spray prior to micronizing or after drying as the case may be, the amount of diol added should be in excess of 0.35 to 1.5 percent so that the pigment after milling will contain the necessary amount of coating.

As indicated above, the pigments of this invention are particularly suitable for use in surface coating compositions such as paints, plastics, enamels, lacquers, inks and the like. The invention therefore also comprehends improved surface coating compositions containing titanium dioxide pigment particles treated with the diol.

It has been found moreover that the 2,2,4-trimethyl-1,3-pentanediol treated pigments of this invention not only disperse readily in surface coating compositions without detriment to optical properties and durability but that the dispersion rating of the treated pigment is higher than that of titanium dioxide pigment treated with other known organic agents such as neopentyl glycol and polyethylene glycol-ethylene oxide copolymer.

The invention is further described by reference to the following examples which are illustrative and not limiting of the invention.

EXAMPLE I

A 25 percent solution of 2,2,4-trimethyl-1,3-pentanediol was prepared by adding an equal weight of water to a 50 percent diol and acetone mixture at about 60° C. and agitating the solution for about 20 minutes. The solution was then sprayed onto a titanium dioxide pigment as it was discharged from the pigment drier. The titanium dioxide pigment had been previously coated with 1.0 percent titania, 1.0 percent silica and 2.0 percent alumina. The feed rate of the organic was adjusted so that 0.65 percent 2,2,4-trimethyl-1,3-pentanediol was added to the pigment prior to milling. The treated pigment was then subjected to jet milling in a steam micronizer. Following milling the retained carbon, which represents about one half of the retained diol on the pigment, was 0.20 percent.

EXAMPLES Ia AND Ib

By way of comparison the $TiO_2$ pigment of Example I was treated in a similar manner with neopentyl glycol in the same amount as that used in Example I. Another pigment was run as a control which contained no organic treatment. These control runs were tested for dispersibility. The results tabulated in Table I show that the $TiO_2$ pigment treated with 2,2,4-trimethyl-1,3-pentanediol had superior dispersibility.

TEST FOR WETTABILITY

The wettability of the diol-treated pigments in surface coating compositions was determined by placing 40.0 grams of xylene, 113.2 grams of a short oil alkyd- 50 percent solids, 50.0 grams of diol treated $TiO_2$ and 20.0 grams of 20–30 mesh ceramedia in a 600 milliliter beaker. The mixture was hand stirred to insure complete wetting and the degree was determined by placing the beaker on a dispersator equipped with a three-quarter-inch teflon disc and agitating for 2.0 minutes at 9,000 r.p.m. A sample of the slurry was then withdrawn and the grind checked using a 0–8 Hegman gauge.

EXAMPLES II, IIa AND IIb

Another series of experiments were run using a titanium dioxide pigment of the rutile modification treated with 1.0 percent titania and 3.0 percent alumina.

A 50 percent acetone solution of 2,2,4-trimethyl-1,3-pentanediol was sprayed on the $TiO_2$ calciner discharge which was then subjected to jet milling in a steam micronizer. The amount of 2,2,4-trimethyl-1,3-pentanediol added in Example II was 0.35 percent on a pigment basis. The retained carbon, which represents about one-half of the retained diol on the pigment, was 0.19 percent. For purposes of comparison a similar run IIa was made using 0.75 percent, of polyethylene glycol-ethylene oxide copolymer. In addition another control run IIb was made using no organic coating agent. The results of these experiments are tabulated in Table I and it is shown that the dispersibility of the diol-treated pigment of this invention was superior to those of the controls.

EXAMPLES III, IIIa AND IIIb

Further runs were made using a rutile $TiO_2$ pigment coated with 1.0 percent titania, 1.0 percent silica, and 2.0 percent alumina. 2,2,4-trimethyl-1,3-pentanediol was then added as a solid powder on dryer discharge pigment in Example III and dry blended with the pigment prior to micronizing. The amount of diol added was 0.35 percent on pigment basis. The dryer discharge pigment was then subjected to jet milling in a steam micronizer. For purposes of comparison a similar experiment IIIa was made using 0.75 percent of polyethylene glycol-ethylene oxide copolymer; and another control run IIIb was made using no organic agent. The results of these experiments are shown in Table I. Again the diol treated pigment had superior dispersibility to that of the control.

EXAMPLES IV, IVa AND IVb

A further experiment IV was carried out using a chloride-base rutile $TiO_2$ pigment coated with 1.0 percent alumina. A 50 percent acetone solution of 2,2,4-trimethyl-1,3-pentanediol was sprayed onto the pigment as it was being fed into a steam micronizer. The flow rate of the solution and the pigment feed rate were selected such that the amount of diol added to the pigment was about 0.35 percent on a pigment weight basis. A similar experiment IVa was run using 0.75 percent of the polyethylene glycol copolymer described above as a control. Also a $TiO_2$ pigment, IVb containing no organic coating was run as a control.

The results are shown in Table I. Again the diol treated pigment had superior dispersibility to that of the control.

While this invention has been described and illustrated by the examples shown, it is not intended to be strictly limited thereto, and other variations and modifications may be employed within the scope of the following claims.

TABLE

| Example No. | Pigment Used | Organic Added |
|---|---|---|
|  | Organic-acetone solution sprayed on pigment. |  |
| I | SO$_4$ base Rutile 1% TiO$_2$+1% SiO$_2$+2% Al$_2$O$_3$ | TMPD* |
| Ia | " | NPG** |
| Ib | " | None |
|  | Organic-acetone solution sprayed on pigment. |  |
| II | So$_4$ base Rutile 1% TiO$_2$+3% Al$_2$O$_3$ | TMPD* |
| IIa | " | PEG*** |
| IIb | " | None |
|  | Organic dry blended with pigment. |  |
| III | SO$_4$ base Rutile 1% TiO$_2$+1% SiO$_2$+2% Al$_2$O$_3$ | TMPD* |
| IIIa | " | PEG*** |
| IIIb | " | None |
|  | Organic-acetone solution sprayed on pigment. |  |
| IV | Cl base Rutile 2% Al$_2$O$_3$ | TMPD* |
| IVa | " | PEG*** |
| IVb | " | None |

\* 2,2,4-trimethyl-1,3-pentanediol

\*\* neopentyl glycol

\*\*\* polyethylene glycol-ethylene oxide copolymer having a molecular weight of about 200.

| Example No. | Percent (%) | Dispersion |
|---|---|---|
| I | 0.65 | 2.0 |
| Ia | 0.65 | 0 |
| Ib | — | 0 |
| II | 0.35 | 4.0 |
| IIa | 0.75 | 2.5 |
| IIb | — | 2.5 |
| III | 0.35 | 4.0 |
| IIIa | 0.75 | 2.0 |
| IIIb | — | 2.0 |
| IV | 0.35 | 2.0 |
| IVa | 0.75 | 0 |
| IVb | — | 0 |

I claim:

1. Titanium dioxide pigment composition comprising finely divided $TiO_2$ particles said particles containing a coating of 2,2,4-trimethyl-1,3-pentanediol, the amount of said coating being from 0.35 to 1.50 percent based on the weight of said $TiO_2$.

2. $TiO_2$ pigment particles having a coating thereon of hydrous oxides selected from the group consisting of alumina, titania, silica and mixtures thereof and from 0.35 to 1.50 percent 2,2,4-trimethyl-1,3-pentanediol by weight of the pigment on the surface thereof.

3. $TiO_2$ pigment particles according to claim 2 wherein the hydrous oxide coating comprises titania and alumina.

4. $TiO_2$ pigment particles according to claim 2 wherein the hydrous oxide coating comprises titania, alumina and silica.

5. Process for preparing a diol treated titanium dioxide pigment comprising treating pigmentary titanium dioxide particles with from 0.35 to 1.50 percent 2,2,4-trimethyl-1,3-pentanediol and thereafter recovering titanium dioxide pigment particles having said diol retained on the surface thereof.

6. Process for preparing a diol-treated titanium dioxide pigment comprising coating pigmentary titanium dioxide with hydrous oxides selected from the group consisting of alumina, titania, silica and mixtures thereof and then treating the hydrous oxide coated titanium dioxide pigment with from 0.35 to 1.50 percent 2,2,4-trimethyl-1,3-pentanediol by weight of the pigment.

* * * * *